June 29, 1937.  E. P. ENGSTROM  2,085,015
CASTING METHOD
Filed April 3, 1934
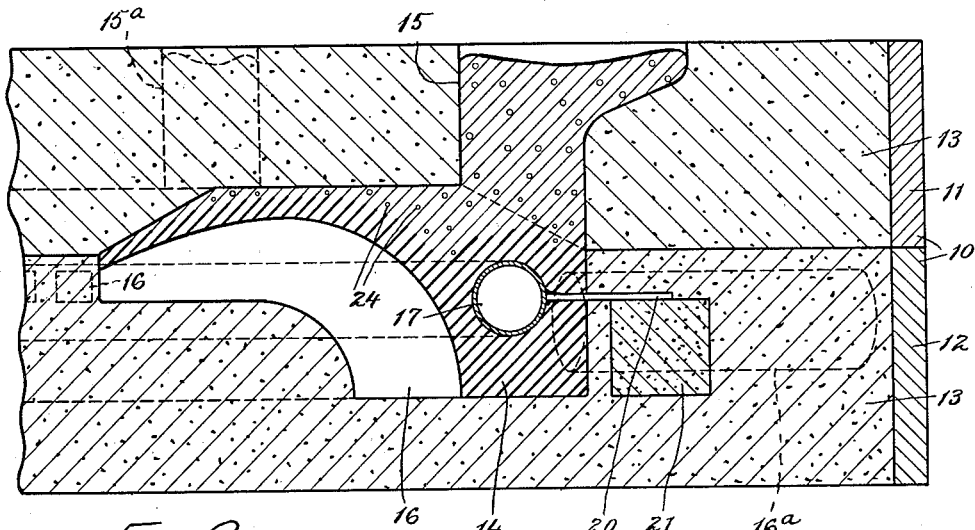
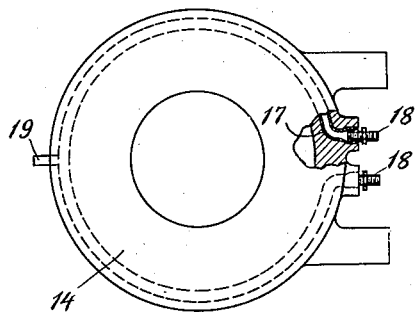
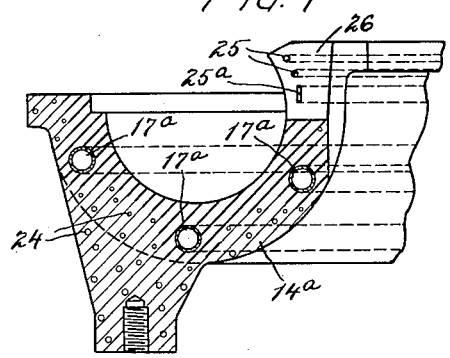
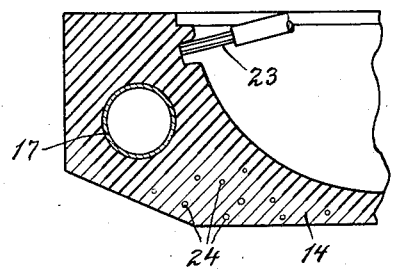
Inventor,
E. P. Engstrom,
By Robert M. Pierson,
Attorney Patented June 29, 1937

2,085,015

UNITED STATES PATENT OFFICE 2,085,015

CASTING METHOD

Ernest P. Engstrom, Akron, Ohio

Application April 3, 1934, Serial No. 718,791

3 Claims. (Cl. 22—203)

This invention relates to the art of casting structural forms including molds or mold members, such as those for vulcanizing rubber articles including tires and tubes, with a light metal such as aluminum and its common alloys with magnesium, copper, silicon, etc.

One object of my invention is to obtain a dense, substantially non-porous texture of the light metal at and for a substantial depth adjacent to at least one face of a comparatively thick casting, and particularly the vulcanizing or molding face of a mold member, against which the outer surface of the article is molded. A further object is to provide an intimate bond or union between the cast body and an embedded insert of a different metal which acts as an internal chill promoting the densification of the light metal during casting, such insert for example being a steel or other metal pipe providing a circulating channel for a heating medium such as steam in the operation of the mold, and providing a reinforcement for the light-metal mold or other structural form, to increase the strength of the casting under bending and other strains.

Heretofore, cores for building large pneumatic tire casings have sometimes been made of aluminum, but in using this material for the vulcanizing surfaces of outer tire-mold members, it has been necessary to resort to the costly expedient of segmental inserts or linings of the light metal, fastened to an iron or steel mold body. It has also been proposed to plate or spray a thin shell of aluminum upon a core having the form of the tire, including non-skid tread projections, and stiffen said shell with a built-up back, but such method is expensive and has not been successful.

Notwithstanding the recognized advantages of lightness, easier machining and greater heat conductivity of aluminum as compared with iron or steel for vulcanizing molds, the attempted casting of such molds of aluminum has heretofore produced such a porous texture of the metal which is later machined to produce a smooth vulcanizing surface and form molding recesses for non-skid projections, etc., as to result in a pitted surface where the tool has cut through into pores, gas bubbles or blowholes in the casting. My present invention solves these difficulties and produces a light-metal cast mold or other structural form having the dense texture and other advantages above referred to, and it also provides composite castings of light and heavy metal of greater strength in relation to their weight than those heretofore known.

On the accompanying drawing, Fig. 1 is a vertical sectional view of a molding flask and contained casting showing the application of my invention to the production of a tire retreading mold-half or member.

Fig. 2 is a plan view of the mold member, partly broken away and in section.

Fig. 3 is a sectional view showing the step of machining the mold face in the dense metal.

Fig. 4 is a vertical sectional view showing the invention as applied in slightly modified form to a mold for an inner tube.

Referring at first to Figs. 1, 2, and 3, 10 is a molding flask comprising cope 11 and drag 12 and containing molding sand 13. By the use of a suitable pattern, a molding cavity is formed in the sand, of a shape corresponding to the casting 14, which in this case is a full-circle retread mold member. A pouring opening or gate 15 is also formed in the cope sand, and other openings or risers such as 15ª on the upper side of the molding cavity may also be formed in the cope sand for breathing and providing an increased head of molten metal at several places around the cavity, producing sprues which are afterwards removed from the casting.

Embedded in the sand of the drag at closely spaced intervals and forming therewith a composite sand and metal lower face of the cavity which is to form the vulcanizing portion of the mold casting 14, are a series of radially-disposed chill blocks 16 which are preferably of aluminum, or the same aluminum alloy as used for the casting, to provide maximum heat dissipation. Other external chill blocks, such as the cylindrical block 16ª shown in broken lines in Fig. 1, may be disposed radially or otherwise at additional points to chill other portions of the casting.

In the course of preparation of the molding cavity there is supported therein a metallic internal chill, here illustrated in the form of a circumferentially-extending pipe 17, preferably of a metal of higher melting point than aluminum. This pipe may have its two ends outwardly bent and led to the periphery of the casting at one side thereof, and later provided with threaded metallic spigots or nipples 18 for making fluid supply and drainage connections, or it may have the fluid connections on opposite sides, including a connection 19, to promote uniform distribution of a heating fluid such as steam. The outwardly-bent ends may be suitably supported in the molding sand or on blocks therein adjacent the molding cavity, and a number of other supporting points for the pipe 17, such as afforded by radial metallic pins 20 affixed to its outer periphery, may be provided and said pins supported on hard blocks 21 of sand and binder in the drag sand, the pipe 17 and its pins 20 remaining in the casting 14 and the excess length of said pins being cut off after removal of the casting. The pipe 17 may be of any suitable metal which will not soften or melt down during the casting, steel having thus far proved the most successful. The wall thickness of the pipe has an important effect on its expanding and contracting characteristics and the tightness of its union with the aluminum casting. I have found that a steel pipe having a wall thickness of the order of 1/16 of an inch gives good results.

The flask being now ready for casting, the molten aluminum is brought thereto in a pouring ladle or pot and introduced into the molding cavity. While various aluminum alloys might be used, good results have been obtained with one containing 12% of magnesium. The metal is not superheated or "supermolten", being poured at a temperature but slightly above its solidifying temperature, that is, one within the ordinary range of temperatures customarily employed in making castings of aluminum or its alloys. The metallic chill blocks 16 in the lower face of the cavity accelerate the cooling and solidification of adjacent molten metal and tend to produce a dense and substantially poreless texture of said adjacent solidified metal for subsequent machining of the molding face without producing a pitted surface. Other chill blocks such as 16ª produce a similar effect at the places where used. But such expedient would be insufficient without the pipe 17, or a similarly functioning internal chill, to carry the poreless texture to a sufficient depth for the pitless removal of a substantial thickness of metal, particularly in the tread portion of a tire mold where non-skid molding recesses, as deep as 3/8 inch or more for large tires, are to be formed.

The entering molten metal rapidly heats the steel pipe 17 because of the relatively small wall thickness of the latter and the insulating character of the non-flowing, dead or static body of air within the pipe, so that said pipe reaches its maximum expansion in length before the solidification of the aluminum has progressed substantially. The ultimate union in fixed relation between the pipe and the aluminum is therefore initiated while the latter is in a molten condition, and is not thereafter destroyed. In cooling, the aluminum shrinks or contracts in volume and the contraction of the pipe 17 proceeds concurrently therewith, substantially from the beginning of solidification of the aluminum, producing a firm and intimate surface bond or union between the two when the pipe surface has previously been properly cleaned. Consequently, in the composite casting, the aluminum is firmly bonded to the steel pipe in intimate surface contact and substantially immovable relation therewith, thus reinforcing the aluminum body by the presence of the pipe and providing a bond of maximum heat conductivity for operation of the mold with a heating or cooling medium. Even where the pipe is not required as a heating conduit, as in many structural forms other than molds, its intimate bonding with the light metal greatly contributes to the strength of the composite casting. The sand embedding the blocks 16 and 16ª, which are spaced from each other approximately as indicated for the former in Fig. 1, aids in dissipating the gases, permits individual and collective expansion of the blocks from the heat of the molten metal, and allows for a substantially unrestrained contraction of the composite casting and the molding assembly of sand and chill blocks in cooling.

When a steel pipe of substantially greater wall thickness is used, such as 1/8 of an inch, it is found that there is such a lag in the heating of the pipe by the molten metal and its contraction in cooling, as to cause an objectionable looseness of the pipe in the final casting. This is avoided by using the thin-walled pipe as described. Even with a thin-walled pipe, if the casting were relatively thin and prematurely chilled externally, as by using a metallic permanent casting mold, the pipe might have to be preheated by means other than the casting metal, or heated to full expansion by running an excess of molten metal through the mold, to avoid premature setting of the casting on the pipe, neither of which operations is required in the use of the combined expedients herein described. An aluminum casting having this closely bonded insert is also free from permanent cooling strains of such magnitude as might tend to cause cracking thereof, although separate annealing may be resorted to if required, particularly for a thick casting. Whereas an embedded straight pipe of different expansion coefficient than the aluminum, in a vulcanizing mold of other than annular form, might in service tend to loosen in the aluminum body due to the extremes of temperature incident to the use and disuse of such molds, and thus to impair the heat-conductive bond and the reinforcing tie between the two, the annular form of the mold body and the pipe or equivalent insert, accommodating the expansion and contraction both circumferentially and radially, preserves the tightness of this bond.

By chilling the molten metal in its lower portions more rapidly than in the upper portions, the volatile pit-forming material or gas is largely expelled upwardly while the relation of the aluminum body to the embedded pipe is being fixed.

Fig. 3 illustrates the machining step in the dense metal of the aluminum casting 14 on the inner side thereof, by means of the usual routing or milling tool 23 for sinking the grooves or recesses to form non-skid projections, and a similar machining may be employed to make recesses for embossed letters, numbers, side ornamentation etc., together with the usual machining by cutting and finishing means for smoothness of the molding surfaces.

In the cross-sectional views of the casting, the poreless, densified light metal is indicated by relatively heavy crosshatching in contrast to its texture at points remote from the vicinity of the chilling surfaces, where the customary pores or gas bubbles 24 may exist.

In the modification shown in Fig. 4, I have illustrated an aluminum casting 14ª formed as the lower member of an inner-tube mold in which the internal casting chill which later forms a fluid-circulating channel is constituted by a plurality of pipes 17ª, or convolutions of the same pipe, preferably of thin steel, employed substantially in the manner previously described and disposed at suitable points around the vulcanizing cavity. Two forms of an auxiliary internal chill are also shown, such as wires 25 of copper or other suitable metal and a band 25ª about 1/16 inch thick if of steel and placed widthwise in the plane of the mold wall. These solid inserts are circumferentially disposed in a zone where the wall is reduced in thickness and may also have to be interrupted, as by the recess 26, to receive a complemental projection on the other mold member for retaining the valve stem through which the tube is inflated during vulcanization and in service. The high conductivity of aluminum in such a situation has a special advantage in promoting the vulcanization of the valve-stem reinforcing patch in the same time as the body of the tube, and in reducing the time required for vulcanization of the tube by a large percentage as compared with an iron or steel mold. The dense metal of the vulcanizing portion of this mold may be machined to a smooth pitless surface, which is highly desirable for the production of merchantable tubes.

It will be understood that other modifications of embodiment and procedure might be made without departing from the scope of my invention as defined in the claims.

I claim:

1. The herein-described casting method which comprises providing a mold having metallic members located to chill the casting from its outer surface, mounting therein a reinforcing and internal chilling, thin-walled insert member of a metal different than the casting metal, pouring a molten light metal such as aluminum into the mold and around said insert member without the use of a cooling means for the latter, thereby causing its full expansion while the casting metal is solidifying thereon, internally and externally chilling the casting metal to a substantially poreless texture by the action of said chilling members, and contracting the casting and the insert member by cooling in an immovably bonded relation.

2. The method of making composite light-metal castings which comprises preparing a sand-mold cavity having spaced metallic chill blocks embedded in its wall, mounting therein a relatively thin-walled, ferrous-metal insert pipe, pouring a molten light metal such as aluminum into the mold and around the pipe while maintaining in said pipe a substantially static body of air, internally and externally chilling the casting metal to a substantially poreless texture, and contracting the casting and the insert by cooling in an immovably bonded relation.

3. The method of casting an annular, light-metal vulcanizing mold which comprises preparing an annular sand-mold cavity having an annular series of spaced metallic chills in the walls thereof, with its lower face approximating the shape of the ultimate molding face of the mold, mounting longitudinally in said cavity a ferrous-metal insert pipe having a wall thickness of the order of $\frac{1}{16}$ of an inch and capable of reaching its full expansion by the heat of the molten casting metal while the latter is internally solidifying thereon, introducing a molten light metal such as aluminum into said cavity and around the insert while maintaining a static body of insulating gas in the latter, fully expanding said insert by the heat of the casting metal while the latter is being internally and externally chilled to a substantially poreless texture by and around the insert and against the mold chills, and concurrently contracting the casting and insert in an immovably bonded relation by cooling in the sand.

ERNEST P. ENGSTROM.